(12) United States Patent
Vielhaber

(10) Patent No.: US 10,341,340 B2
(45) Date of Patent: Jul. 2, 2019

(54) AUTHENTICATION SYSTEM FOR A MOBILE DATA TERMINAL

(71) Applicant: ASMAG-Holding GmbH, Gruenau im Almtal (AT)

(72) Inventor: Johann Vielhaber, Gruenau im Almtal (AT)

(73) Assignee: ASMAG-Holding GmbH, Gruenau im Almtal (AT)

( * ) Notice: Subject to any disclaimer, the term of this patent is extended or adjusted under 35 U.S.C. 154(b) by 155 days.

(21) Appl. No.: 15/023,462

(22) PCT Filed: Sep. 18, 2014

(86) PCT No.: PCT/AT2014/050210
§ 371 (c)(1),
(2) Date: Jun. 15, 2016

(87) PCT Pub. No.: WO2015/039157
PCT Pub. Date: Mar. 26, 2015

(65) Prior Publication Data
US 2016/0285865 A1    Sep. 29, 2016

(30) Foreign Application Priority Data
Sep. 20, 2013   (AT) .................................. 50598/2013

(51) Int. Cl.
*H04L 29/06* (2006.01)
*H04W 12/06* (2009.01)
*H04W 4/80* (2018.01)

(52) U.S. Cl.
CPC ...... *H04L 63/0861* (2013.01); *H04L 63/0853* (2013.01); *H04W 4/80* (2018.02); *H04W 12/06* (2013.01)

(58) Field of Classification Search
CPC .......... H04L 63/0861; H04L 63/0853; H04W 12/06; H04W 4/008
See application file for complete search history.

(56) References Cited

U.S. PATENT DOCUMENTS 6,999,606 B1   2/2006   Frischholz
7,027,617 B1   4/2006   Frischholz
(Continued)

FOREIGN PATENT DOCUMENTS

CA   2 734 613 A1   2/2010
CN   1534898 A      10/2004
(Continued)

OTHER PUBLICATIONS

International Search Report of PCT/AT2014/050210, dated Jan. 23, 2015.
(Continued)

*Primary Examiner* — Brandon S Hoffman
*Assistant Examiner* — William A Corum, Jr.
(74) *Attorney, Agent, or Firm* — Collard & Roe, P.C.

(57) ABSTRACT

The invention relates to an authentication system (14) comprising a data terminal (1) with a data terminal device, a communication network (15), and an authentication service (16), said data terminal device having an image capturing device (3), an image preparing module (4), and a wireless communication interface (5). A communication connection (17) is established between the data terminal device and the authentication service (16) via the communication network (15), said data terminal (1) being provided in the form of a watch.

12 Claims, 3 Drawing Sheets

(56) References Cited

U.S. PATENT DOCUMENTS

| | | |
|---|---|---|
| 7,181,763 B2 | 2/2007 | Hiraiwa et al. |
| 7,257,393 B2 | 8/2007 | Akiyama et al. |
| 8,847,732 B2 | 9/2014 | Schroeter |
| 8,977,010 B2 | 3/2015 | Frischholz et al. |
| 2002/0129268 A1 | 9/2002 | Ito et al. |
| 2002/0180586 A1 | 12/2002 | Kitson et al. |
| 2003/0103414 A1 | 6/2003 | Lyon |
| 2004/0192260 A1 | 9/2004 | Sugimoto et al. |
| 2005/0224573 A1 | 10/2005 | Yoshizane et al. |
| 2008/0248838 A1 | 10/2008 | Chiang |
| 2010/0263031 A1 | 10/2010 | Tsuchiya |
| 2012/0030108 A1 | 2/2012 | Katina |
| 2013/0036480 A1 | 2/2013 | Anderson et al. |
| 2013/0232073 A1 | 9/2013 | Sheets et al. |
| 2013/0237190 A1 | 9/2013 | Smith et al. |
| 2013/0239202 A1 | 9/2013 | Adams et al. |
| 2014/0333415 A1* | 11/2014 | Kursun ............... G06F 21/32 340/5.83 |
| 2015/0035643 A1* | 2/2015 | Kursun ............. G07C 9/00158 340/5.52 |
| 2016/0342784 A1* | 11/2016 | Beveridge .............. H04L 67/08 |
| 2017/0235935 A1* | 8/2017 | Song ...................... G06F 21/35 |

FOREIGN PATENT DOCUMENTS

| | | |
|---|---|---|
| CN | 1829146 A | 9/2006 |
| CN | 102216941 A | 10/2011 |
| CN | 103235476 A | 8/2013 |
| DE | 101 26 375 A1 | 12/2002 |
| EP | 1 119 822 B1 | 2/2003 |
| EP | 1 408 440 A2 | 4/2004 |
| EP | 1 147 494 B1 | 9/2005 |
| EP | 1 914 656 A1 | 4/2008 |
| EP | 1 978 648 A1 | 10/2008 |
| EP | 2 240 882 B1 | 12/2012 |
| EP | 2 584 493 A2 | 4/2013 |
| RU | 74231 U1 | 6/2008 |
| RU | 2419154 C2 | 5/2011 |
| RU | 2011141218 A | 5/2013 |
| WO | 2013/134299 A1 | 9/2013 |

OTHER PUBLICATIONS

Response to European Patent Office by Austrian Patent Attorney in PCT/AT2014/050210, dated Jul. 20, 2015, with English translation of relevant parts.
Russian Office Action in RU 2016115057107(023700), dated Jun. 7, 2018, with English translation of relevant parts.

* cited by examiner

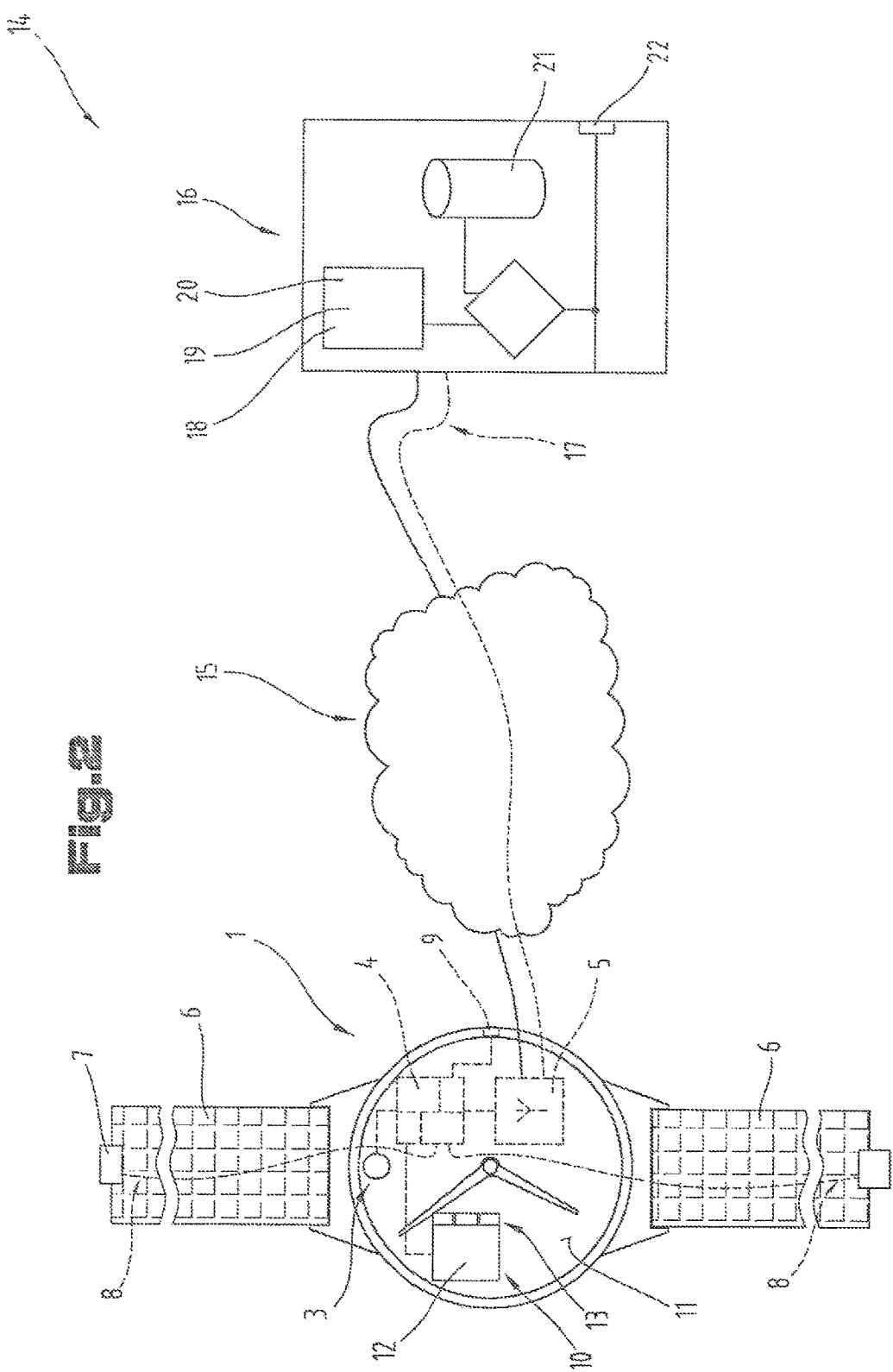

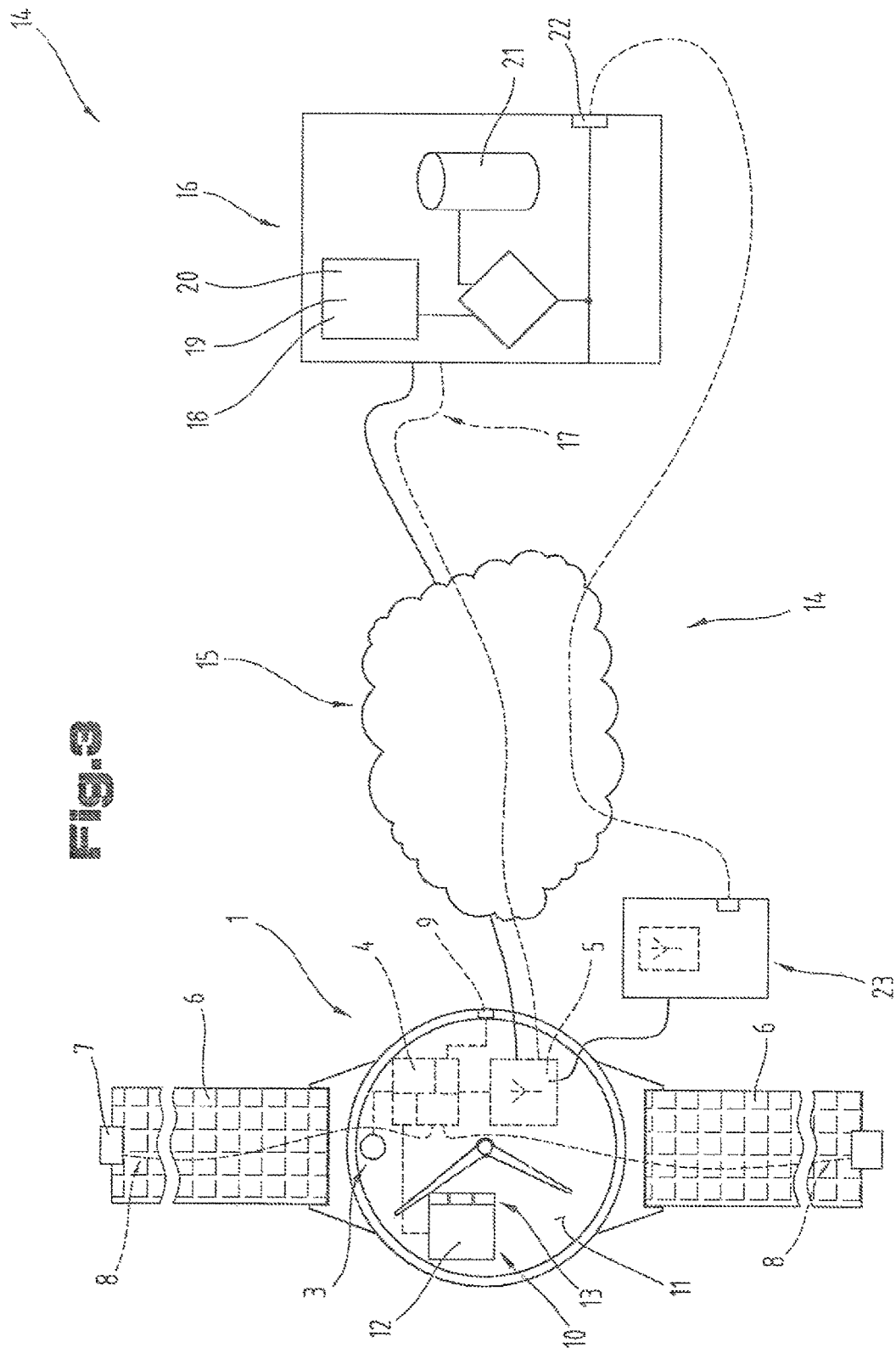

AUTHENTICATION SYSTEM FOR A MOBILE DATA TERMINAL

CROSS REFERENCE TO RELATED APPLICATIONS

This application is the National Stage of PCT/AT2014/050210 filed on Sep. 18, 2014, which claims priority under 35 U.S.C. § 119 of Austrian Application No. A 50598/2013 filed on Sep. 20, 2013, the disclosure of which is incorporated by reference. The international application under PCT article 21 (2) was not published in English.

The invention relates to an authentication system comprising a data terminal, a communication network and an authentication service.

In a period of increased mobility the availability of mobile authentication is becoming increasingly important, At a time when document-based authentication methods were used a person could mostly only be identified at a small number of selected and geographically fixed institutions. For example, this was performed by public authorities, administrative bodies and legal institutions, such as notaries and lawyers. Owing to the shift from providing services in geographically fixed premises to providing mobile services via data terminals, the need for authentication in a mobile setting has also changed.

On the one hand service providers are understandably interested in being able to authenticate persons wishing to use a service in a reliable and secure manner. On the other hand people are also increasingly interested in being able to authenticate themselves reliably to a service provider or for example to a public authority.

From the prior art it is known to use mobile computers for this purpose, for example laptops. In most cases such devices have sufficient processing capacity to be able to perform the partly very complex method of analysis for the authentication. Mostly such systems were provided with a database in which authorized users were saved. To perform the user authentication a biometric feature of the person was captured, prepared as necessary and compared with the saved features. In the case of a match access was granted to the device or the requested transaction.

A disadvantage of such systems is mainly that biometric reference data are saved on the device and a mobile computer in particular is unsuitable for performing rapid authentication because of its size and the often very long start-up times.

As technology has developed on the one hand so-called smartphones provide mobile data terminals which have become smaller and at the same time are much more powerful. On the other hand such smartphones are being used more widely. When a smartphone is used correctly it is assumed that such a device has a continual data connection to a communication network, in particular it is assumed that it has a permanent connection to the internet. Therefore, it is becoming less necessary to save comprehensive user reference data on the mobile data terminal. Said data can be saved on a central and mostly highly secure server. The mobile data terminal is then used essentially as a detection and processing device which detects a biometric feature of the person to be authenticated and transmits this via the communication network to a central service.

For example document WO 2013/134299 A1 shows a two-step system for processing secure payment. Here after a request for payment a biometric feature is detected by means of a smartphone, the latter is transmitted to a payment system where the detected, biometric feature is analyzed. If there is match the payment is authorized.

Furthermore, systems are also known which use an external medium as the clear identification feature of a person. Preferably, a so-called smartcard is used for this, where it is assumed that it only has one allocated user or that only said person has access to the smartcard. For example, documents US 2013/0237190 A1 and US 2013/239202 A1 disclose systems in which a mobile data terminal is coupled to a smartcard in order to provide authentication.

The disadvantage of mobile computer systems is mainly their size and their associated inflexibility with respect to the rapid and simple authentication of a person. Smartphones have the advantage in this respect that they are considerably smaller and more compact and are thus also more widely used.

The disadvantage of both systems is however that because of their potential processing capacity they are also used for a plurality of other applications. There is thus always a considerable risk that the authentication process of the device may be compromised as a result of manipulation. Furthermore, it is a disadvantage that smartphones and laptops are often subject to property crimes, so that in this case the authentication of the person is no longer possible, for example as a result of reporting the property crime.

The objective of the invention is thus to create an authentication system which provides the highest degree of security with respect to the reliable authentication of a person and which overcomes the disadvantages of the prior art with respect to easy availability.

The objective of the invention is achieved by an authentication system comprising a data terminal with a data terminal device, a communication network and an authentication service. The data terminal device comprises an image capturing device, an image preparing module and a wireless communication interface. A communication connection is provided via the communication network between the data terminal device and the authentication service. In particular, the data terminal is in the form of a watch.

The advantage of this embodiment is in particular that a watch is mostly always worn as an object of daily use without needing a separate carrying device or space in a bag or the like. Thus the data terminal is always available for performing an authentication.

Thus in one development the watch is designed as a wrist watch or pocket watch or pin-on watch. An advantage of this development is also that a watch is not generally considered to he a data terminal which is helpful if the authentication process needs to be concealed.

According to one development the image capturing device is formed by a flat image sensor, For example, this can consist of a widely known CCD image sensor with a quadratic or rectangular sensor surface. To perform a reliable authentication the sensor should have a minimum resolution of 640 dots on the shortest side.

Furthermore, the communication interface is designed as a long-range interface and/or as a close-range interface. WLAN is preferably used as the long-range interface, as in this way good connectivity can be ensued with a plurality of remote receiving terminals. As already known, a distance of several tens of meters can be bridged by WLAN. Bluetooth, ZigBee or also NFC can be used as the close-range interface for example. The range of such communication systems is limited to a few meters or centimeters. It can thus be ensured that connectivity is only restricted to a very limited range. This limited range can be easily watched by the user during the authentication for recognizing an attempt to pry.

It is also an advantage if the communication interface is designed as a mobile radio interface according to an international mobile radio standard. In this way the data terminal can produce a direct connection to the communication network or the authentication service, without being dependent on an intermediate connection of a long-range communication system. Long-range communications systems are difficult to spy on with appropriate security measures but can still be spied upon more easily than a mobile radio connection. This embodiment is therefore advantageous with respect to the security of the communication connection.

An embodiment is advantageous in which the communication interface is designed to be unidirectional, whereby a two-path authentication can be achieved. In this case an authentication request is initiated by the mobile data terminal, the acknowledgement of a positive/negative authentication by the authentication service is performed in a different way. For example the authentication request could be made at a POS (point of sale) using the POS identifier, the response of the authentication service is sent directly to the POS.

In addition to authenticating a person it can be an advantage if the current system is also used to authenticate a device of the person. Therefore, according to one development the data terminal device comprises a data interface. In this way the data terminal can be connected to the device to be authenticated and the authentication can be performed. After a successful authentication the device can perform actions with the authorizations of the person.

As the present data terminal is a watch, wherein particularly if the latter is in the form of a wrist watch there is mostly good contact with the skin surface, according to one development the data terminal device also comprises an interface for a Body Area Network (BAN). In a BAN different sensors can communicate with one another for monitoring the vital signs of a person with the close range of the skin. This can be used for example to monitor the arrangement of the watch on a person with vital signs. In this way a clear allocation of the data terminal to a living person can be ensured.

According to one development the authentication service comprises a 2D/3D image analysis module. It is possible to analyze in this way whether the image of a 2D photo, or a 3D object has been captured. In this way it is possible to prevent a manipulation attempt using a photograph of the person to be authenticated. A system of this kind is known from the prior art, for example from EP 2 584 493 A2.

Furthermore, the authentication service is provided with a face detection and face recognition module. In a captured image the face needs to be found in order to perform a further analysis for the authentication. Methods for finding objects or for releasing faces are known from the prior art, for example from EP 1 119 822 B1 and DE 101 26 375 A1.

In a further embodiment for ensuring the authentication of a living person and not an image a motion detection module is provided in the authentication service. In particular, it is possible to check by means of a motion detection module whether the detected image is performing random movements in an expected manner. Thus the person to be identified can be asked to adopt specific directions of vision. With a change in the direction of vision of a person the proportions of their face have to change in certain dimensions. If they do not then it can be assumed that a 2D photo of the person is being held in front of the image capturing device. For example EP 1 147 494 B1 shows such a motion detection module.

According to a further embodiment the authentication service comprises as database in which user reference data are saved. Said database is preferably secured, in particular physically and also in terms of data technology, in order to ensure the greatest possible security of the saved data.

According to an advantageous development the watch is integrated into a mobile communication device, in particular into a smartphone.

It is also the case that the data terminal is arranged in an independent housing. By means of an independent housing all of the components of the data terminal, in particular data terminal device, can be arranged in a compact and protected manner. Preferably, the housing is designed as a watch housing in order if necessary to conceal the safety-relevant function of the data terminal.

In order to provide a response to the person to be authenticated, about the authentication process, it is an advantage if the data terminal device comprises an output means which is arranged on the data terminal, preferably on a front side of the housing. The output means can be formed for example by a display, preferably an LCD or TFT display was selected. It is also an advantage if in addition or alternatively a status display is provided for example in the form of a light display. For the correct authentication it is necessary for the person to be located at a specific distance from the data terminal. In particular, the image capturing device needs to be in a position to completely capture the relevant feature of a person. Therefore, the person can be given a response by means of the output means about how the distance needs to be changed or whether the capturing or authentication has been successful.

An essential security risk when authenticating a person by using a mobile data terminal is ensuring that the data terminal can actually be assigned to the person who is performing the authentication. Therefore, it is an advantage if in a rear wall of the housing a biometric detection device is arranged which is connected to the data terminal device. In this way it can be ensured that when performing the authentication, the data terminal is attached onto a body part with biometric features. It is an advantage in particular if the biometric detection device is designed to detect the vein structure of the skin, which is a clear biometric feature. In this way a clear allocation of the data terminal to a person is possible. Such a biometric safe device is known for example from EP 2 240 882 B2. Here biometric reference patterns or the vein structure are saved on the data terminal which have to coincide with the detected features.

According to one development the housing comprises a holding device or a holding device is arranged on the housing, wherein the holding device is designed for arranging the housing on a person, This development has the advantage, that the mobile data terminal can be worn as a wrist watch.

According to one development for the reliable allocation of the mobile data terminal to a person the holding device comprises a closure element, which closure element is connected via a contact fork line to a safety circuit module of the data terminal device. It can thus be clearly seen whether the holding device is closed and whether there is an allocation of the mobile data terminal to a person. However, it is possible in particular to recognize when the closure element was opened and thus there is no longer a clear allocation. This is particularly important as it is thus possible to maintain an authentication as long as the holding device is closed and thus assigned to a person. As soon as the closure element has been opened the authentication can be lifted.

For a better understanding of the invention the latter is explained in more detail with reference to the following Figures.

In a much simplified, schematic representation:

FIG. 2 shows the representational authentication system;

Figure 1:
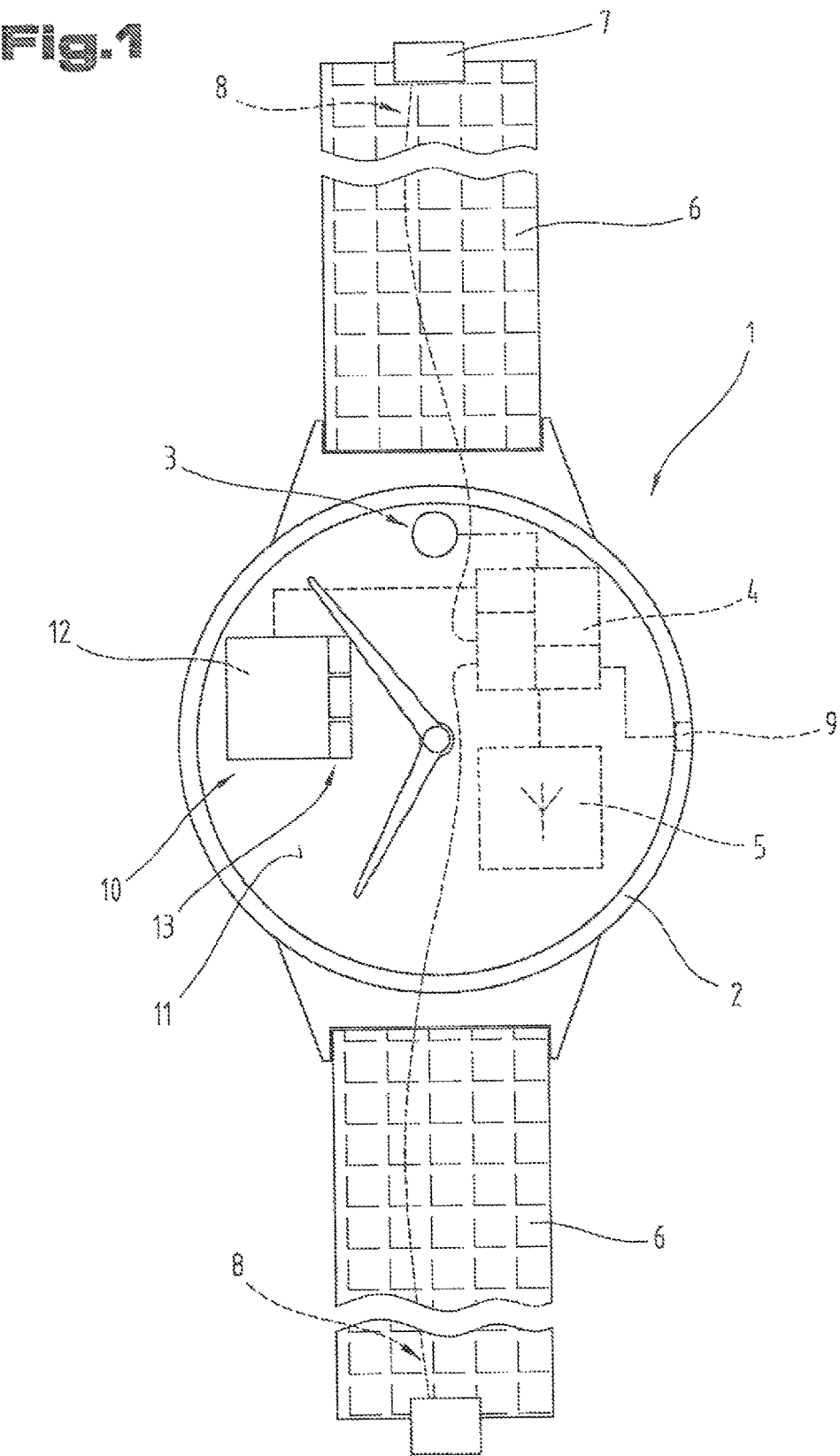
FIG. 1 shows a representational data terminal.

FIG. 3 a further possible embodiment of the representational authentication system.

FIG. 1 shows a data terminal 1 of the representational authentication system. The data terminal 1 is designed as a watch, which watch is arranged in an independent housing 2.

The data terminal 1 also comprises a data terminal device, which data terminal device comprises an image capturing device 3, an image preparing module 4 and a wireless communication interface 5.

To arrange the data terminal 1 on a person, in particular on a body part of a person, it is also the case that the housing 2 comprises a holding device 6, or a holding device 6 is arranged on the housing 2.

Preferably, the holding device 6 comprises a closure element 7, which is connected via a contact fork line 8 to a safety circuit module of the data terminal device.

According to one development it is possible that the data terminal device comprises a data interface 9, which data interface 9 is preferably designed for connecting the data terminal 1 to a device to be authenticated.

According to one development it is also the case that the data terminal device comprises an output means 10 which is preferably arranged in a front side 11 of the housing 2. The output means can comprise a display 12 for example which shows the image captured by the image capturing device 3. Thus the user can be provided with a visual check during the authentication to see whether the data terminal 1 is being held in correct relation to the body of the user, in particular to the face. If the position is correct the correct position can be displayed for example by means of a color change on the display 12.

However, it is also possible that the output means 10 also or alternatively comprises a light display 13, by means of which the user can also be informed about the correct positioning of the data terminal 1. For example the correct position can be displayed by means of a traffic light system.

FIG. 2 shows a possible embodiment of the present authentication system 14, comprising a mobile data terminal 1, a communication network 15 and an authentication service 16. A communication connection 17 is produced via the communication network 15 between the wireless communication interface 5 and the authentication service 16. Preferably, said communication connection 17 is designed to be bidirectional, however it is also possible to have a unidirectional design, from the data terminal 1 to the authentication service 16. The authentication service 16 preferably comprises a 2D/3D image analysis module 18, a face detection and face recognition module 19 as well as a motion detection module 20. Furthermore, the authentication service 16 comprises a database 21 in which user reference data are saved.

if an authentication request is now triggered by the data terminal 1, an image, or a sequence of images of the person to be authenticated are captured by the image capturing device 3, processed if necessary and transmitted via the communication connection 17 to the authentication service 16. The face detection and face recognition module 19 determines from the transmitted captured data a face, or the position of the face in the image for further processing. Afterwards the 2D/3D image analysis module 18 is used to check whether the detected image is an image of a real person, i.e. a 3D object, or whether an image of a 2D photo has been captured.

As the image capturing device 3 can also be used to capture moving images in addition to one or more still images, the motion detection module 20 can analyze a movement sequence which can only occur when the images of a real person have been captured. After performing one or more image analysis the result of the analysis is compared with the user reference data saved in the database 21 and if there is match a positive authentication signal is sent back to the data terminal 1 or provided to an external service provider via an interface 22.

FIG. 3 shows a further possible embodiment of the present authentication system 14. FIG. 2 showed an embodiment in which an external service provider could get to positive authentication by means of an interface 22 of the authentication service 16 and could then provide the requested service.

FIG. 3 shows the option in which a user can make an authentication request at the site of service provision, at a point of sale (POS) 23. For example, said POS 23 may be a checkout, an entry control and/or an identification check of a public authority. Preferably, the communication interface 5 is also designed as a close-range interface and can thus provide a short-range data connection with a corresponding remote station of the point of sale (POS) 23. The authentication result can now be transmitted back from the authentication service 16 via the communication connection 17 to the data terminal 1, in order to be transmitted from the latter via the communication interface 5 to the POS 23. However, it is also possible for the close-range interface to be designed to be unidirectional and thus for example can only transmit a unique identifier of the POS 23 to the authentication service 16. The authentication result of the authentication service 16 can now be transmitted by means of the transmitted identification of the POS directly to the POS, for example via the interface 22 of the authentication service 16. In this way the authentication safety can be increased, as the result of the authentication is not provided by the device triggering the authentication, but the latter is transmitted back via an independent route.

Lastly, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Furthermore, also individual features or combinations of features of the different shown and described example embodiments can also represent independent solutions according to the invention.

The problem addressed by the independent solutions according to the invention can be taken from the description.

All of the details relating to value ranges in the present description are defined such that the latter include an and all part ranges, e.g. a range of 1 to 10 means that an part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure of the authentication system, the latter and its components have not been represented true to scale in part and/or have been enlarged and/or reduced in size.

LIST OF REFERENCE NUMERALS 1 data terminal
2 housing
3 image capturing device
4 image preparing module
5 communication interface
6 holding device
7 closure element
8 contact fork line
9 data interface
10 output means
11 front side
12 display
13 light display
14 authentication system
15 communication network
16 authentication service
17 communication connection
18 2D/3D image analysis module
19 face detection and face recognition module
20 motion detection module
21 database
22 interface
23 point of sale (POS)

The invention claimed is:

1. An authentication system comprising:
a data terminal with a data terminal device,
a communication network,
an authentication service, and
a point of sale, the point of sale comprising a remote station,
wherein the data terminal device comprises an image capturing device, an image preparing module, a wireless communication interface, and an interface for a body area network,
wherein the communication interface comprises a long-range interface and a close-range interface, the close-range interface being unidirectional,
wherein there is a first communication connection via the long-range interface of the communication network, between the communication interface of the data terminal device and the authentication service,
wherein an authentication request is triggered by the data terminal device on the point of sale via the close-range interface of the communication interface,
wherein a close-range data connection between the communication interface of the data terminal device and the corresponding remote station of the point of sale is produced via the close-range interface,
wherein the communication interface is configured to capture a unique identifier from the point of sale via the close-range data connection and is configured to transmit the unique identifier to the authentication service via the first communication connection of the communication network,
wherein the data terminal is in the form of a watch,
wherein the authentication service comprises a face detection and face recognition module, a 2D/3D image analysis module, and a database, the 2D/3D image analysis module being configured to receive at least one image, the at least one image being captured by the image capturing device and being transmitted from the data terminal to the authentication service via the first communication connection, the 2D/3D image analysis module being configured to recognize a real person as a 3D-object in the at least one image captured by the image capturing device and transmitted to the authentication service,
wherein the face detection and face recognition module is configured to perform image analysis on the at least one image,
wherein the face detection and face recognition module is configured to compare a result of the image analysis with user reference data saved in the database,
wherein the authentication service further comprises an authentication service interface,
wherein there is a second communication connection between the point of sale and the authentication service interface via the communication network, and
wherein the face detection and face recognition module is configured to transmit an authentication signal via the transmitted unique identifier directly to the point of sale via the second communication connection of the communication network.

2. The authentication system as claimed in claim 1, wherein the watch is designed as a wrist watch or pocket watch or pin-on watch.

3. The authentication system as claimed in claim 1, wherein the image capturing device is formed by a flat image sensor.

4. The authentication system as claimed in claim 1, wherein the communication interface is designed as a mobile radio interface according to an international mobile radio standard.

5. The authentication system as claimed in claim 1, wherein the data terminal device comprises a data interface.

6. The authentication system as claimed in claim 1, wherein the authentication service comprises a motion detection module.

7. The authentication system as claimed in claim 1, wherein the watch is integrated into a mobile communication device, in particular a smartphone.

8. The authentication system as claimed in claim 1, wherein the data terminal is arranged in an independent housing.

9. The authentication system as claimed in claim 8, wherein the data terminal device comprises an output device arranged on the data terminal, preferably in a front side of the housing.

10. The authentication system as claimed in claim 8, wherein in a rear wall of the housings a biometric detection device is arranged which is connected to the data terminal device.

11. The authentication system as claimed in claim 8, wherein the housing comprises a holding device or a holding device is arranged on the housing, and wherein the holding device is designed for arranging the housing on a person.

12. The authentication system as claimed in claim 8, wherein the holding device comprises a closure element, which closure element is connected via a contact fork line to a safety circuit module of the data terminal device.

* * * * *